United States Patent [19]

Abe et al.

[11] Patent Number: 4,538,231

[45] Date of Patent: Aug. 27, 1985

[54] CIRCUIT FOR ELECTRIC POWER SOURCE

[75] Inventors: Shunichi Abe; Mitsuo Akiyama; Yoshihiko Kudo, all of Tokyo, Japan

[73] Assignee: Konishiroku Photo Industry Co., Ltd., Tokyo, Japan

[21] Appl. No.: 379,745

[22] Filed: May 19, 1982

[30] Foreign Application Priority Data

May 28, 1981 [JP] Japan ............................. 56-82373

[51] Int. Cl.³ .................... G05F 1/46; G06F 15/20
[52] U.S. Cl. ............................... 364/483; 364/492; 323/323; 323/283
[58] Field of Search ............... 364/492, 483; 323/322, 323/283, 241, 312, 323; 340/662, 663

[56] References Cited

U.S. PATENT DOCUMENTS

| | | | |
|---|---|---|---|
| 3,733,540 | 5/1973 | Hawkins | 363/89 |
| 4,245,150 | 1/1981 | Driscoll et al. | 340/663 |
| 4,298,939 | 11/1981 | Fluegel | 364/492 |
| 4,315,316 | 2/1982 | Boros et al. | 323/283 |

FOREIGN PATENT DOCUMENTS 0129457 6/1979 Japan .................................. 323/283

OTHER PUBLICATIONS

Microprocessor Control Of High Frequency Switching Power Supplies, Q. L. Benedict et al., IBM Technical Disclosure Bulletin, Mar. 81 pp. 4401–4406.

Primary Examiner—Felix D. Gruber
Assistant Examiner—Thomas G. Black
Attorney, Agent, or Firm—Jordan B. Bierman

[57] ABSTRACT

An apparatus and method for stabilizing an output of a D.C. power source by using a micro-computer to regulate an input voltage to provide an output voltage according to a controlling signal. The invention further utilizes a periodic interruption process in the program sequence which moniters the output voltage, compares it to a predetermined level and regulates the output voltage in accordance with the monitered voltage.

6 Claims, 7 Drawing Figures

FIG. 6-I
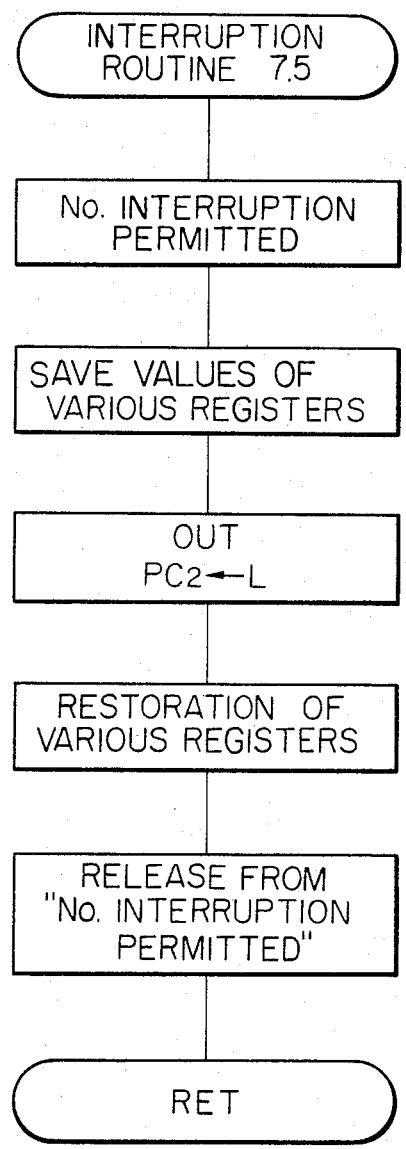
FIG. 6-II
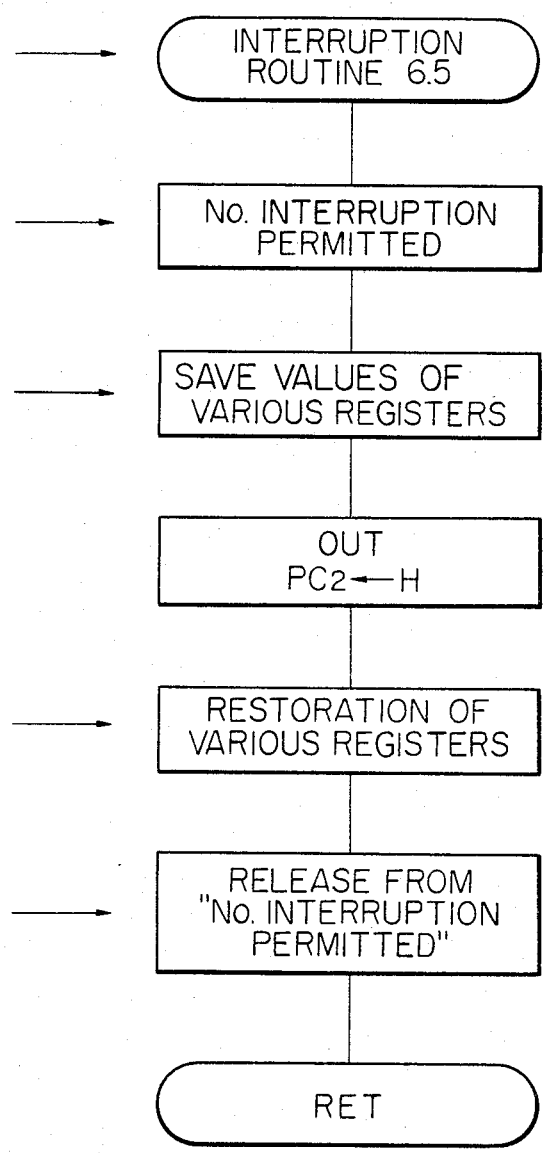

CIRCUIT FOR ELECTRIC POWER SOURCE

BACKGROUND OF THE INVENTION

1. Field of the Invention:

The present invention relates to a circuit for electric power source which may be applied to an equipment such as a copier which has loads such as a clutch, solenoid, high voltage unit, D.C. motor and a micro-computer on board.

2. Description of the Prior Art:

Generally, in an electrophotographic copier a variety of devices are arranged so as to carry out a series of copying processes. Of such devices, there are, for example, a paper feeding device to feed copy paper, a driving device to synchronously drive both a lamp-mirror of an optical scanning system and a photosensitive drum, a high voltage unit to supply a high voltage to the respective electrodes for charging, transferring and electrostatically separating operations, and the like. Inside said devices, there are provided mechanical parts such as a clutch, solenoid, D.C. motor, or an electric power source input section, and the input voltage of the order of several tens of volt must be applied in general in order to operate each.

Heretofore, for an input voltage fed to said mechanical parts, there has been used a stable voltage (such as a three-terminal regulator output or a switching regulator output) or an electric power source full-wave rectified by a diode bridge, for example, after a voltage of 100V A.C. is stepped-down by a transformer, with all the faults such as expensive costs and instability.

In the case of using a stabilized power source such as a three-terminal regulator and the like, a voltage not lower than a certain voltage is converted into heat which is consumed in order to stabilize the power source. Therefore the efficiency thereof is insufficient and a large capacity capacitor for a smoothing effect is required, so that the costs thereof have been relatively expensive. With the switching regulator as shown in FIG. 1, the circuit constitution has become complicated, so that the cost is seriously high.

Now, in the case of using an unstabilized full-wave rectified power source, the device can be simplified and economized in cost. However, they have the following problems:

(1) There is the different period of time (i.e., the response) to attain a required torque between the case of commencing to drive such mechanical parts at the neighborhood of the wave form of 0V and the case at the neighborhood of the wave form of the peak, so that accurate control is impossible.

(2) Even if the wave form effective value is, say, 24V, the peak value thereof is of the order of 34V, so that the driving element such as a transistor or a thyristor must be selected having the absolute maximum rating with sufficient allowances and it is apprehended that the cost thereof may become expensive, and (3) The voltage fluctuation of the power source for a copier affects directly such a device, so that the rotational rate of a D.C. motor fluctuates. To cope therewith, in a clutch and the like for example, there must be selected parts having enough torque with allowances to take said fluctuation into consideration.

SUMMARY OF THE INVENTION

In the present invention, the faults in said stabilized power source and in the power source for a full-wave rectified wave have been overcome and an inexpensive cost has been attained, and further its stability is superior to power sources for full-wave rectified wave and it generates a sufficiently stabilized voltage output, so as to serve as a suitable power source for said clutch, solenoid, D.C. motor and high voltage unit.

The circuits for power sources according to the invention attain the aforesaid functions with the use in common of a micro-computer for controlling the operations of a copier or others and with only the addition thereto of a voltage detection circuit and a switching circuit, which are inexpensive in cost and also suitable for driving the mechanical parts of the copier.

BRIEF DESCRIPTION OF THE DRAWINGS

FIG. 6-I and FIG. 6-II respectively illustrate the flow-chart for each of the interruption process routines 7.5 and 6.5 in the power source circuit exemplified in FIG. 5.

DETAILED DESCRIPTION OF THE PREFERRED EMBODIMENTS

Figure 2:
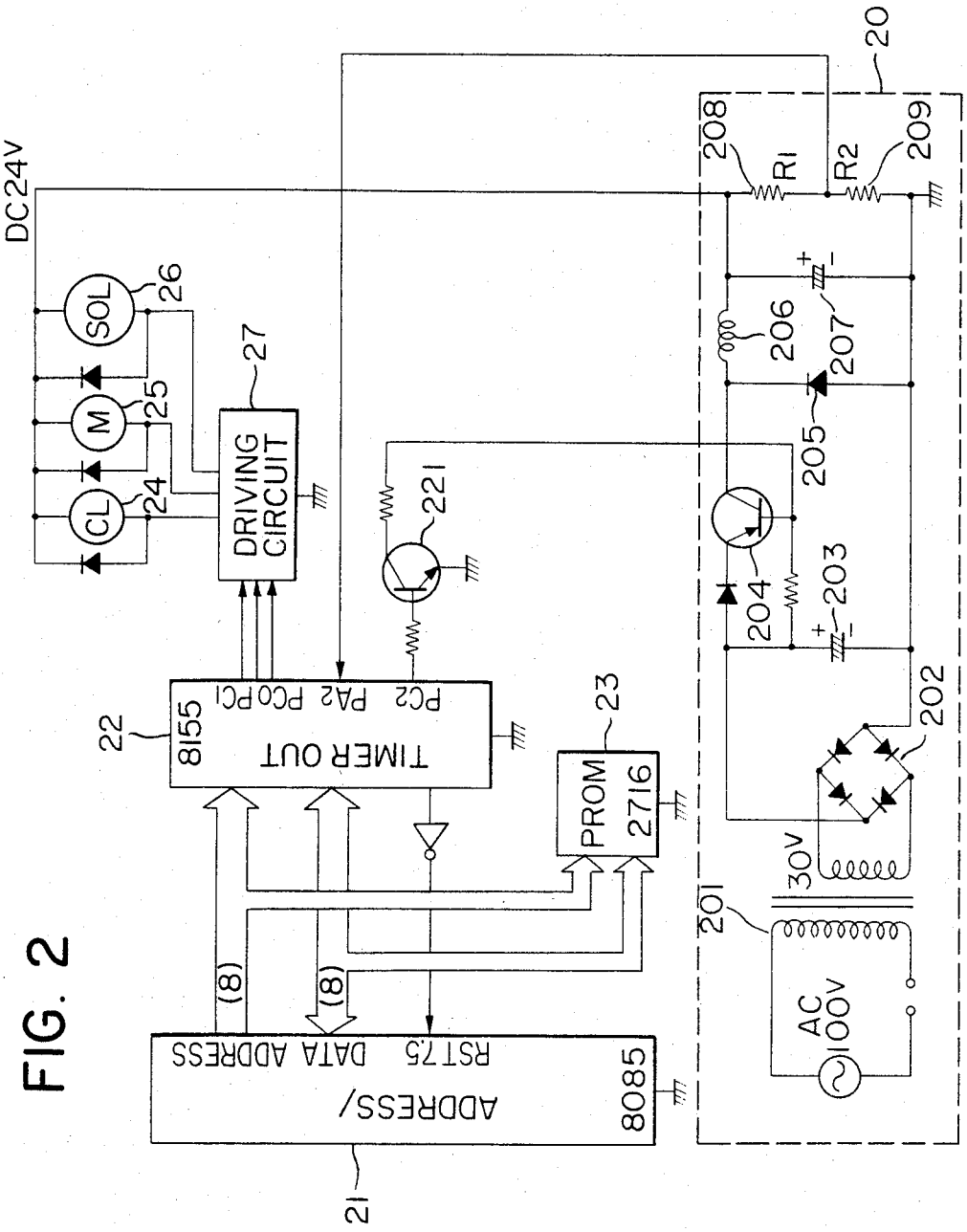
FIG. 2 is an example of a stabilized power source circuit constituted by utilizing a micro-computer of the invention.

Hereinafter, referring to one of the examples of the invention given in FIG. 2 the description thereof will be made:

In FIG. 2, the section bounded by a dashed line is power supply section 20 controlled by a micro-computer for the system having CPU (Intel 8085) 21, I/O port 22 built therein with RAM and a timer, and PROM 23 that is a writable and erasable memory. The micro-computer drives optical system forward travelling clutch CL 24, paper feeding D.C. motor M 25 and solenoid SOL 26 at the voltage of 24 V as to the load, respectively.

Figure 1:
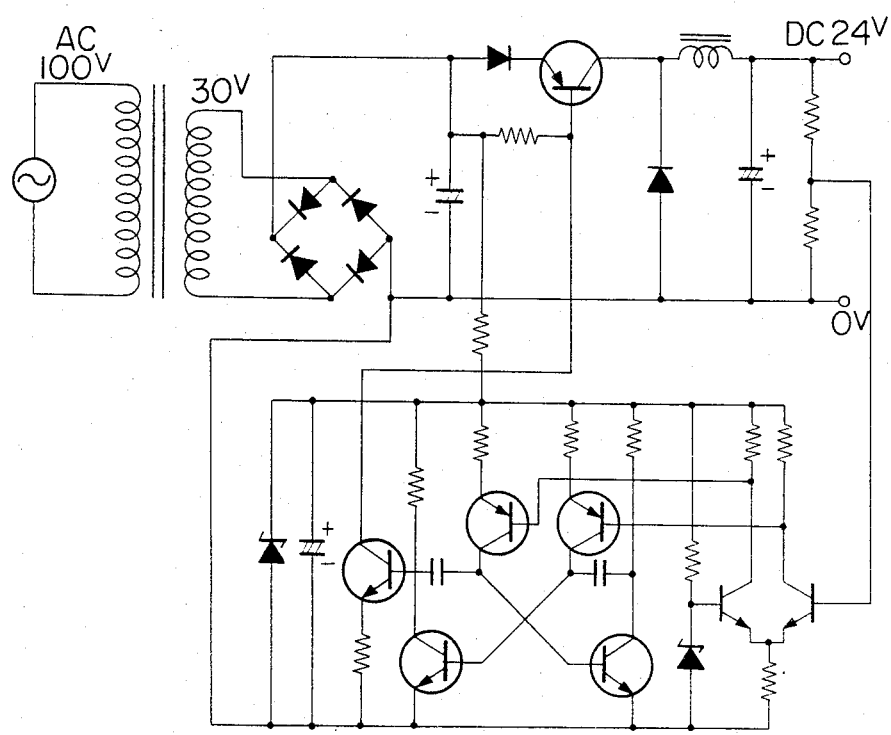
FIG. 1 illustrates an example of a stabilized power source circuit that is intermittently controlled by a conventional technique.

To be more concrete, after the input of A.C. 100 V is stepped down to the order of A.C. 30 V by means of voltage transmitter 201, a full-wave form is produced by means of diode bridge 202 and applied to both terminals of capacitor 203 and thus smoothed. Thereafter, as shown in FIG. 1, it is conventional to generate a stabilized voltage by means of transistor 204. However, in the invention, the transistor 204 is switched on and off by controlling the output from output port $PC_2$ of I/O port (Intel 8155) 22 since the base of transistor 204 is connected through a resistor to the collector of transistor 221 which is also connected to output port $PC_2$ of I/O port (Intel 8155) 22.

The collector of transistor 204 supplies the stabilized output of D.C. 24 V through the output stabilizing circuit comprising capacitor 207 to clutch CL 24, motor M 25 and solenoid SOL 26 to serve as the power sources thereof. Said output of D.C. 24 V is divided through resistors 208, 209 and the voltage thus divided is inputted to $PA_2$ that is assigned to serve as the input port of I/O port (Intel 8155) 22.

That is to say, should there be a fluctuation of load or the like, the voltage of D.C. 24 V varies and a voltage variable according thereto is inputted in I/O port (Intel 8155) 22 of the micro-computer. Output port $PC_2$ is controlled in accordance with said input information and thus transistor 204 in power supply section 20 is driven so as to stabilize the output voltage of D.C. 24 V.

Figure 3:
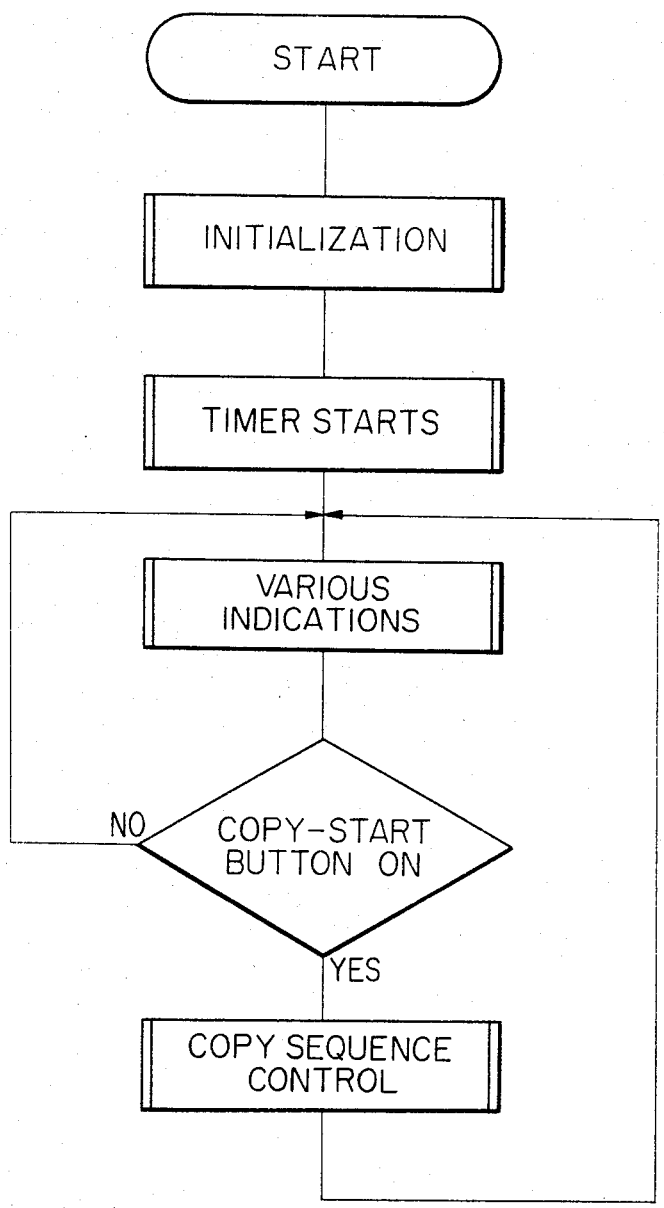
FIG. 3 is a brief flow-chart for a sequence control carried out with the micro-computer to be used for the power source circuit of the invention.
Figure 4:
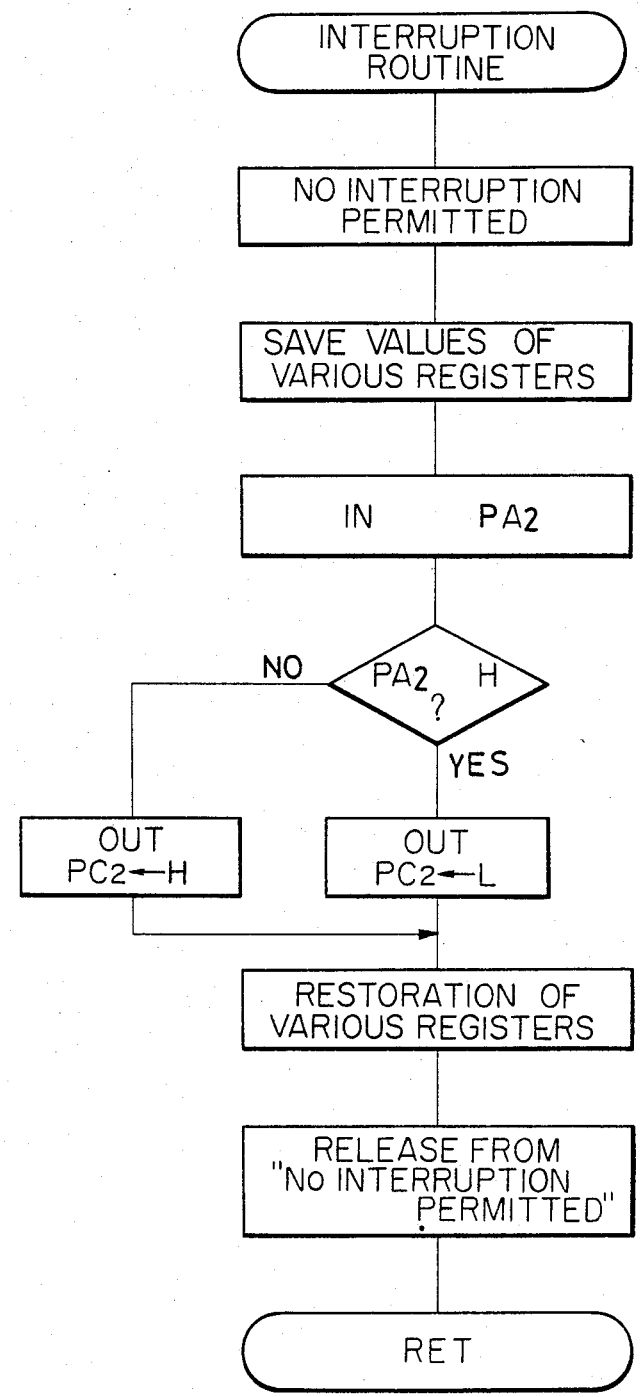
FIG. 4 is a flow-chart of an interruption process routine for attaining the stabilized output voltage from the power source circuit of the invention constituted as shown in FIG. 2.

Therein, the micro-computer is used for stabilizing the output from an electric power circuit, in parallel with the controls for the other sequence for copying operation. Therefore in the flow-chart of a copying sequence shown in FIG. 3 if the timer is set so as to generate pulses with the intervals of every 0.1 m sec. for example, a timer-out signal from I/O port (Intel 8155) 22 is inputted to the terminal RST 7.5 of CPU (Intel 8085) 21 so that interruptions with the intervals of every 0.1 m sec. can be effected. The CPU (Intel 8085) 21 branches off in specific operands through the order given from RST 7.5 to effect the routine processes for interruptions which are stored in said specific operands. The interruption process is so arranged as to read the input information to said $PA_2$ according to the flow-chart shown in FIG. 4 and to correspondingly control $PC_2$. The stabilized outputs at both ends of capacitor 207 are divided by resistors $R_1$ and $R_2$ respectively. And when the voltage thus divided coincides with the threshold level of I/O port (Intel 8155) 22 an interruption process is commenced. When an interruption process is commenced once, any other interruption is prohibited and the contents of every register are saved. Thereafter the address of CPU (Intel 8085) 21 is set and port $PA_2$ of I/O port (Intel 8155) 22 is designated, and the information of port $PA_2$ in the I/O port is inputted. And, when $PA_2$ is in the state of H (i.e., a high level) of the information, output port $PC_2$ of I/O port 22 is set at L, and when the state is L (i.e., a low level) said output port $PC_2$ is set at H. Thereafter, every register having been saved is restored to release said prohibition from interruption and the interruption process is thus completed. This interruption process is carried out every 0.1 m sec. set by the timer. As the period of time to run the program for the interruption process is less than 0.1 m sec., running of another regulation program is delayed less than 0.1 m sec. For the regulation of an electrophotographic copier or the like, such delay has no effect on the regulation process.

Figure 5:
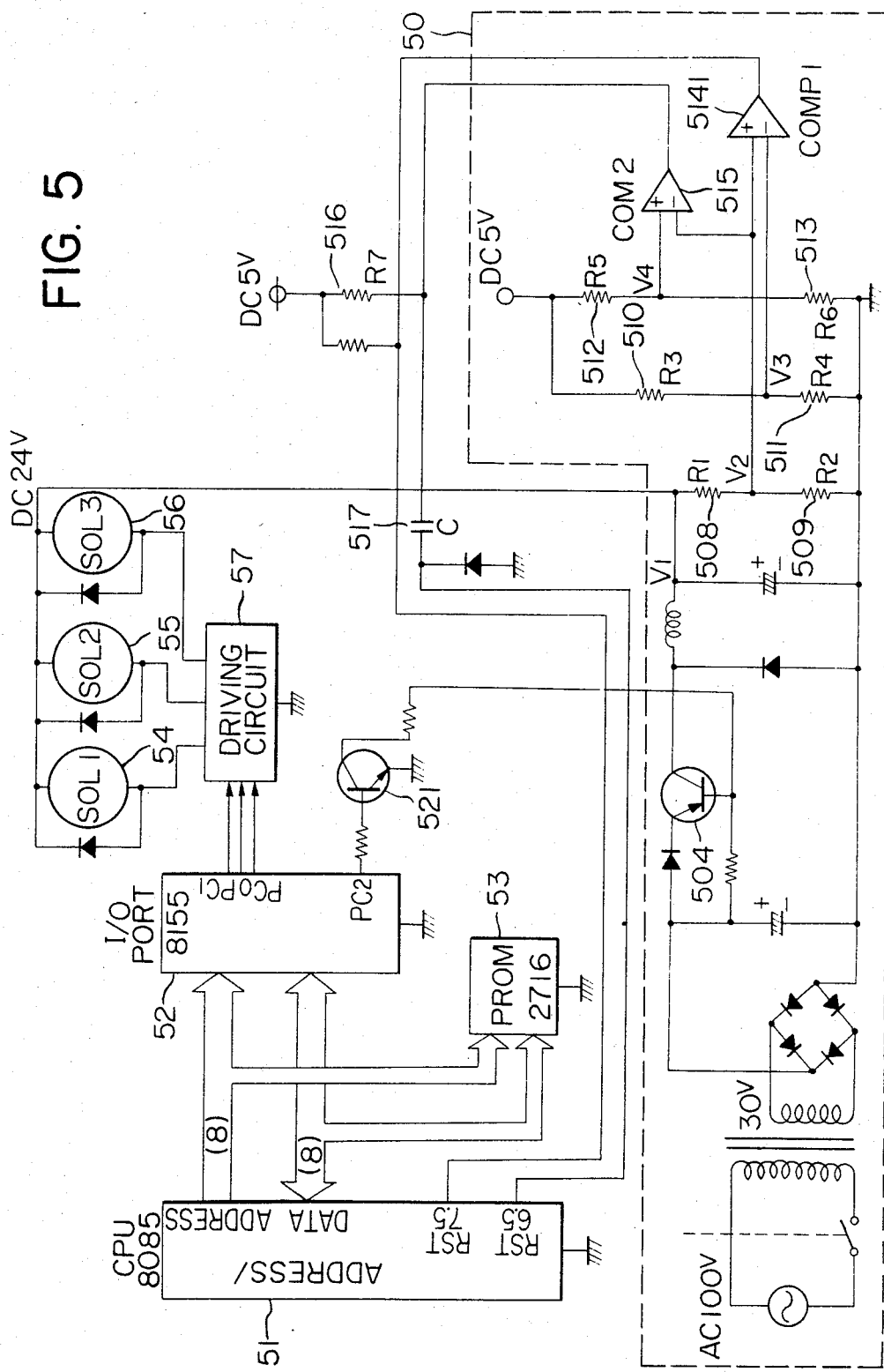
FIG. 5 is one of the examples of a power source circuit constituted by the invention.

FIG. 5 illustrates the constitution of another circuit of the invention, in which the constitution of power supply section 50 bounded by the dashed line is different from that shown in FIG. 2. The micro-computer section comprises CPU (Intel 8085) 51, I/O port (Intel 8155) 52 and PROM (Intel 2716) 53 and a drive circuit 57 for driving solenoids SOL 1, 54, SOL 2, 55, SOL 3, 56 to serve as the loads. The constitution of the power supply section except the output means thereof is the same as that shown in FIG. 2. In this example, voltage $V_2$ divided from stabilized output voltage (D.C. 24 V) $V_1$ by resistors $R_1$ 508 and $R_2$ 509 is inputted to the non-inversion input of comparator COMP 1, 514 and is also inputted to the inversion input of comparator COMP 2, 515. The reference (i.e., control) voltages $V_3$ and $V_4$ of these comparators COMP 1 and COMP 2 are different from said stabilized output voltage $V_1$, respectively. For instance, by making use of the voltage of D.C. 5 V used for the power source of the micro-computer, said 5 V is divided by resistors $R_2$, 510 and $R_4$, 511 to make a voltage as to $V_3$ and is also divided by resistors $R_5$, 512 and $R_6$, 513 to make another voltage as to $V_4$.

As an example, to establish the reference voltages $V_3$ and $V_4$ of comparators, in the case that $V_1$ is set at D.C. 24 V, the resistance ratio of resistor $R_1$ to resistor $R_2$ is determined at 5:1 and $V_2$ is set at 4 V, so that $V_3 = 4.01$ V, $V_4 = 3.99$ V in comformity with the fluctuation limitation of the stabilized output voltage, for example. Resistance of resistors $R_3$ through $R_6$ are determined so as to make said $V_3$ and $V_4$ from the D.C. 5 V.

When the voltages of $V_2$, $V_3$, $V_4$ are set as described above and if $V_1$ fluctuates to rise and $V_2$ rises also relatively to satisfy the relative condition of $V_2 > V_3$ (4.01 V), the output of comparator COMP 1 generates an H signal to input to the terminal of RST 7.5 in CPU (Intel 8085), so that the CPU stops the operation of the program counter to branch the program to a specific operand (i.e. Operand 3C). In the operand 3C, there is stored interruption process routine 6.5 as shown in FIG. 6-I and in this case the program is to give an L signal to output port $PC_2$ of I/O port 52. Consequently transistor 521 connected to the $PC_2$ is switched off and transistor 504 of power supply section 50 is operated to the switch-off side, so that the collector voltage of transistor 504 and in its turn stabilized output voltage $V_1$ are stepped down. Then, as $V_1$ is stepped down, $V_2$ is also stepped down. When $V_2$ is stepped down to satisfy the relative condition of $V_2 < V_4$ (3.99 V), then the output of comparator COMP 2 gives an H signal. Said H signal is converted into a positive pulse wave through the differentiating circuit comprising resistor $R_7$, 516 and capacitor C, 517, and is then inputted to the terminal of RST 6.5 of the CPU. As the result thereof, the CPU carries out the interruption process of RST 6.5 and the program skips over to the operand 34 to carry out the interruption process routine 6.5 (the flow-chart thereof is shown in FIG. 6-II) stored therein and thus gives an H signal to $PC_2$. Consequently, transistor 521 is switched on and the voltage of $V_1$ is stepped up.

As described above, the voltage of $V_1$ is repeated to step up and down. To be more concrete, in the case of the example in which said $V_3$ and $V_4$ are set at 4.01 V and 3.99 V, respectively, $V_2$ fluctuates between 3.99 V and 4.01 V while $V_1$ is regulated between 23.94 V and 24.06 V according to the fluctuation of $V_2$.

The example of the invention has been described as above, and modifications of the invention can of course be embodied, such as by having a photothyrister driven by the output of $PC_2$, wherein the output from said photothyrister is further inputted to the gate of a triac provided to the input means on the primary side such as A.C. 100 V. Then the primary input voltage is regulated intermittently, and thereby resultingly a stabilized output voltage is regulated.

In the invention, a micro-computer is used mainly for controlling the a sequence of a copier operation and at the same time an interruption process is also used efficiently. Thus the maintenance of a stable power source voltage can be attained, in parallel with aforesaid sequence control, by the additional attachment of a simple device.

What is claimed is:

1. A method for stabilizing an output of a D.C. power source by using a micro-computer comprising the steps of:

regulating an input voltage so as to provide an output voltage according to a controlling signal;

monitoring a voltage relating to said output voltage;
comparing said monitored voltage with a predetermined threshold voltage;
operating a periodic interruption process of said micro-computer in accordance with a timer sequence;
and generating said controlling signal for said regulating step so that said output voltage is stabilized according to said comparing step in said periodic interruption process.

2. The method according to claim 1, wherein said controlling signal is latched between said interruption process and a next interruption process.

3. A method for stabilizing an output of a D.C. power source by using a micro-computer comprising the steps of:
regulating an input voltage so as to provide an output voltage according to a controlling signal;
monitoring a voltage relating to said output voltage;
providing a first threshold voltage set below a predetermined output voltage to be stabilized, and a second threshold voltage set above the predetermined output voltage to be stabilized;
comparing said monitored voltage with said predetermined first and second threshold voltages;
operating an interruption process of said micro-computer when said monitored voltage reaches said first or second threshold voltages; and
generating said controlling signal for said regulating step so as to increase said output voltage when said monitored voltage is below said first threshold voltage, and to decrease said output voltage when said monitored voltage is above said second threshold voltage in said interruption process.

4. The method according to claim 3, wherein said controlling signal is latched between said interruption process and a next interruption process.

5. An apparatus for stabilizing an output of a D.C. power source by using a micro-computer comprising:
regulating means for regulating an input voltage to provide an output voltage according to a controlling signal;
monitoring means for monitoring a voltage relating to said output voltage;
comparing means for comparing said monitored voltage with a predetermined threshold voltage;
interrupting means for operating a periodic interruption process of said micro-computer in accordance with a timer sequence; and
generating means for generating said controlling signal for said regulating means so that said output voltage is stabilized by an output of said comparing means in said periodic interruption process.

6. An apparatus for stabilizing an output of a D.C. power source by using a micro-computer comprising:
regulating means for regulating an input voltage so as to provide an output voltage according to a controlling signal;
monitoring means for monitoring a voltage relating to said output voltage;
threshold means for providing a first threshold voltage set below a predetermined output voltage to be stabilized, and a second threshold voltage set above the predetermined output voltage to be stabilized;
comparing means for comparising said monitored voltage with said predetermined first and second threshold voltages;
interrupting means for operating an interruption process of said micro-computer when said monitored voltage reaches said first or second threshold voltages; and
generating means for generating said controlling signal for said regulating means so as to increase said output voltage when said monitored voltage is below said first threshold voltage, and to decrease said output voltage when said monitored voltage is above said second threshold voltage in said interruption process.

* * * * *